US008180884B1

(12) United States Patent
Hall

(10) Patent No.: US 8,180,884 B1
(45) Date of Patent: May 15, 2012

(54) METHOD AND APPARATUS FOR MONITORING, REPORTING AND CHARGING FOR SERVICES IN AN APPLICATION NETWORK

(75) Inventor: Robert J. Hall, Berkeley Heights, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 891 days.

(21) Appl. No.: 11/290,924

(22) Filed: Nov. 30, 2005

(51) Int. Cl.
*G06F 15/173* (2006.01)
*G06F 15/16* (2006.01)

(52) U.S. Cl. ........................ 709/224; 709/206

(58) Field of Classification Search .................. 455/466, 455/433, 414.1; 370/401, 463, 399; 709/206
See application file for complete search history.

(56) References Cited

U.S. PATENT DOCUMENTS

| | | | |
|---|---|---|---|
| 6,314,446 B1 | 11/2001 | Stiles | |
| 6,418,542 B1 | 7/2002 | Yeager | |
| 6,639,687 B1 | 10/2003 | Neilsen | |
| 6,842,898 B1 | 1/2005 | Carlson et al. | |
| 7,181,489 B2* | 2/2007 | Lection et al. | 709/202 |
| 7,502,968 B2* | 3/2009 | Betancourt et al. | 714/38.11 |
| 7,640,488 B2* | 12/2009 | Bar-Yossef et al. | 715/205 |
| 2003/0115157 A1* | 6/2003 | Circenis | 705/400 |
| 2005/0049974 A1* | 3/2005 | Jani et al. | 705/64 |
| 2005/0096970 A1* | 5/2005 | Weber | 705/11 |
| 2006/0101466 A1* | 5/2006 | Kawachiya et al. | 718/100 |

* cited by examiner

*Primary Examiner* — Jeffrey Pwu
*Assistant Examiner* — Saad A Waqas

(57) ABSTRACT

A method and apparatus is disclosed for the monitoring of active threads in a network service, such as a content transformation service. A network element periodically samples active threads that are indicative of an active session of a service being provided to a subscriber. Identifiers associated with the active threads are collected and stored in, for example, a network log along with related information, such as the subscriber identifying information associated with the thread and/or the amount of network resources utilized by the thread. The collected information is then made available or displayed for use in, or example, controlling the usage of a network service or billing for services based accurately on the amount of network resources consumed by a subscriber.

12 Claims, 6 Drawing Sheets

| SAMPLE TIME | 605 | 606 | 607 THREAD INFORMATION | 608 |
|---|---|---|---|---|
| T=42 | TH=#17 | APP=#4 | ------- | RUN, b,c,... |
| | TH=#426 | APP=#12 | USER #811 | RUN, f,g,h,... |
| | TH=#511 | APP=#4 | USER #19 | WAIT, a,b,c,... |
| | | | | |
| ⋮ | ⋮ | ⋮ | ⋮ | ⋮ |
| T=53 | TH=#58 | APP=#12 | USER #806 | RUN, f,g,h,... |
| | TH=#117 | APP=#4 | ------- | WAIT, a,b,d,... |
| | | | | |
| ⋮ | ⋮ | ⋮ | ⋮ | ⋮ |
| T=61 | | | | |
| | ... | | | |
| | ... | | | |
| | ... | | | |
| ⋮ | ⋮ | ⋮ | ⋮ | ⋮ |

601, 602, 603, 604

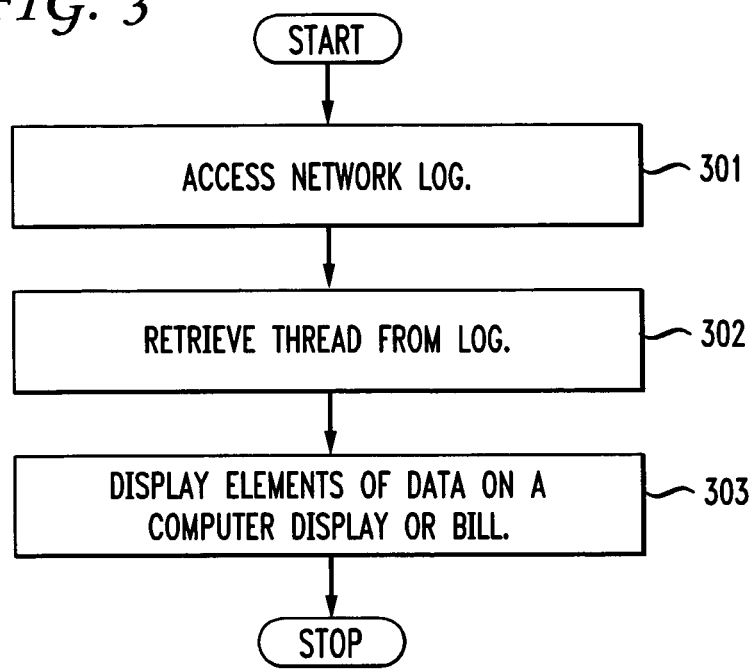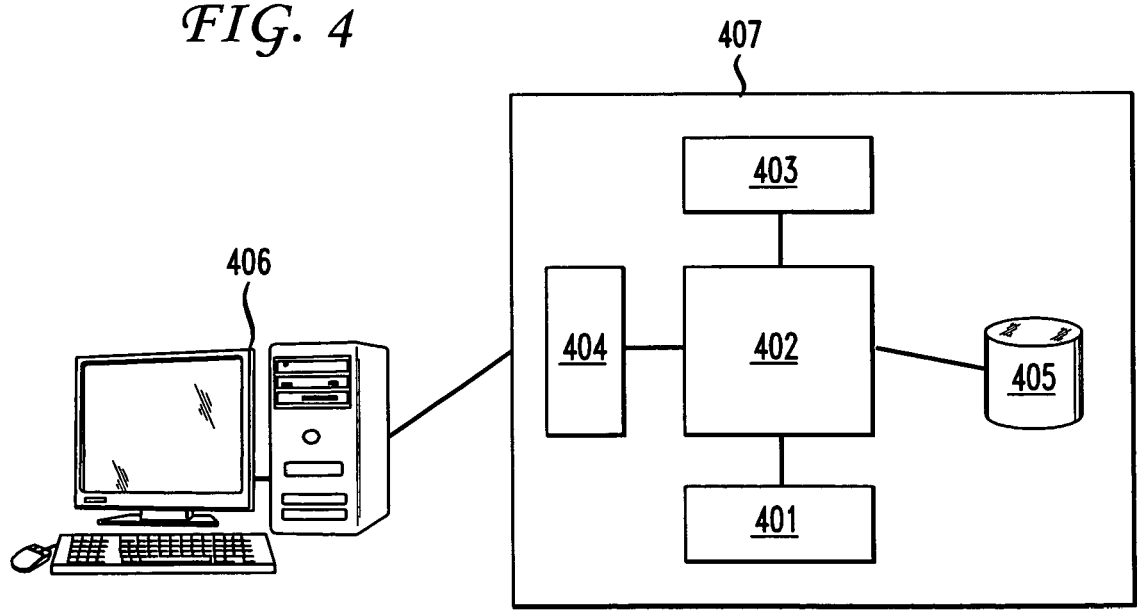

FIG. 6

| SAMPLE TIME (601) | (605) | (606) | THREAD INFORMATION (607) | (608) |
|---|---|---|---|---|
| T=42 | TH=#17 | APP=#4 | ------- | RUN, b,c,... |
|  | TH=#426 | APP=#12 | USER #811 | RUN, f,g,h,... |
|  | TH=#511 | APP=#4 | USER #19 | WAIT, a,b,c,... |
|  |  |  |  |  |
| ⋮ | ⋮ | ⋮ | ⋮ | ⋮ |
| T=53 | TH=#58 | APP=#12 | USER #806 | RUN, f,g,h,... |
|  | TH=#117 | APP=#4 | ------- | WAIT, a,b,d,... |
|  |  |  |  |  |
|  |  |  |  |  |
| ⋮ | ⋮ | ⋮ | ⋮ | ⋮ |
| T=61 |  |  |  |  |
|  | ... |  |  |  |
|  | ... |  |  |  |
|  | ... |  |  |  |
| ⋮ | ⋮ | ⋮ | ⋮ | ⋮ |

602, 603, 604

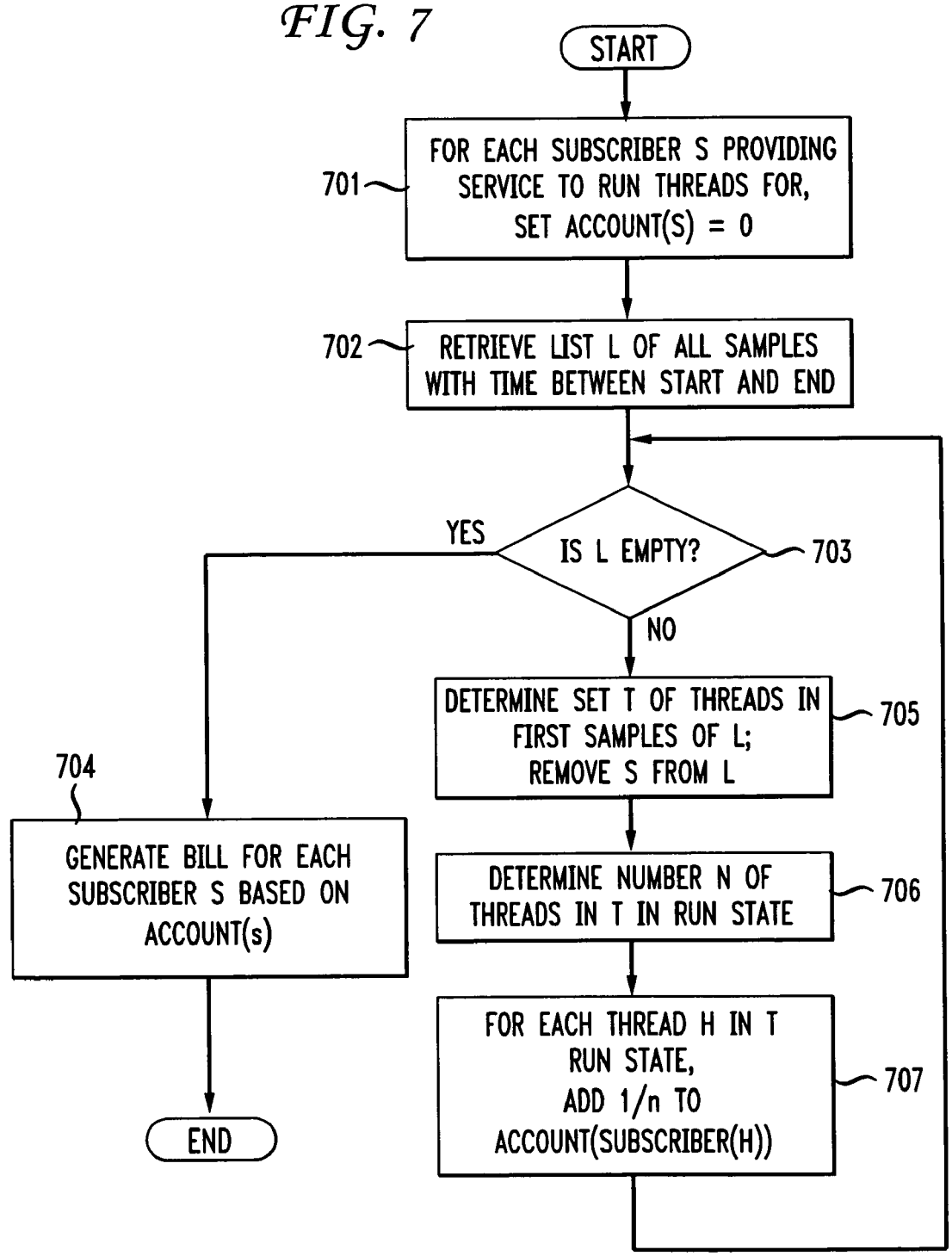

METHOD AND APPARATUS FOR MONITORING, REPORTING AND CHARGING FOR SERVICES IN AN APPLICATION NETWORK

BACKGROUND OF THE INVENTION

Many different types of communication networks are used for many different purposes. In networks that provide services to customers, host application servers are frequently used to provide various services and applications to network subscribers. However, a perennial problem has been how to accurately monitor, control and charge for the services that are provided to a subscriber. This problem has become exacerbated due to the increasingly distributed nature of modern communication networks. Specifically, such networks frequently consist of one application running on multiple different hosts in a distributed fashion to provide services to a greater number of subscribers in an efficient manner. Thus, there are potentially many different instances of an application running simultaneously. Thus, monitoring network usage and network element resource usage and determining which subscriber is using which portion of such resources is problematic. Additionally, each host may operate several different instances of different applications, thus compounding the complexity of such a determination, especially when network resources are shared among multiple applications. Furthermore, there is a need to control the number and types of application instances allowed to run in the network, including the need to cut off applications when they reach a budget limit, allocate new network elements when demand increases, and deallocate network elements when demand subsides.

SUMMARY OF THE INVENTION

The present invention substantially solves the foregoing problems. Specifically, in accordance with one embodiment of the present invention, a network element monitors active threads of a network service, such as a content transformation service. The network element periodically samples active threads on a network node that are indicative of an active session of a service being provided to a subscriber. Identifiers and other information associated with the active threads are collected and stored in, for example, a network log along with related information, such as the subscriber identifying information associated with the thread and/or the amount of resources consumed by the thread. The collected information is then made available or displayed for use in, for example, controlling the usage of a network service or billing for services based accurately on the amount of network resources consumed by a subscriber.

These and other advantages of the invention will be apparent to those of ordinary skill in the art by reference to the following detailed description and the accompanying drawings.

BRIEF DESCRIPTION OF THE DRAWINGS

FIG. 3 shows a second method in accordance with the principles of the present invention;

FIG. 4 shows a computer adapted for use in accordance with the principles of the present invention;

FIG. 6 shows an illustrative sample log for storing said thread information;

FIG. 7 shows a method in accordance with the principles of the present invention for billing subscribers.

DETAILED DESCRIPTION

Figure 1:
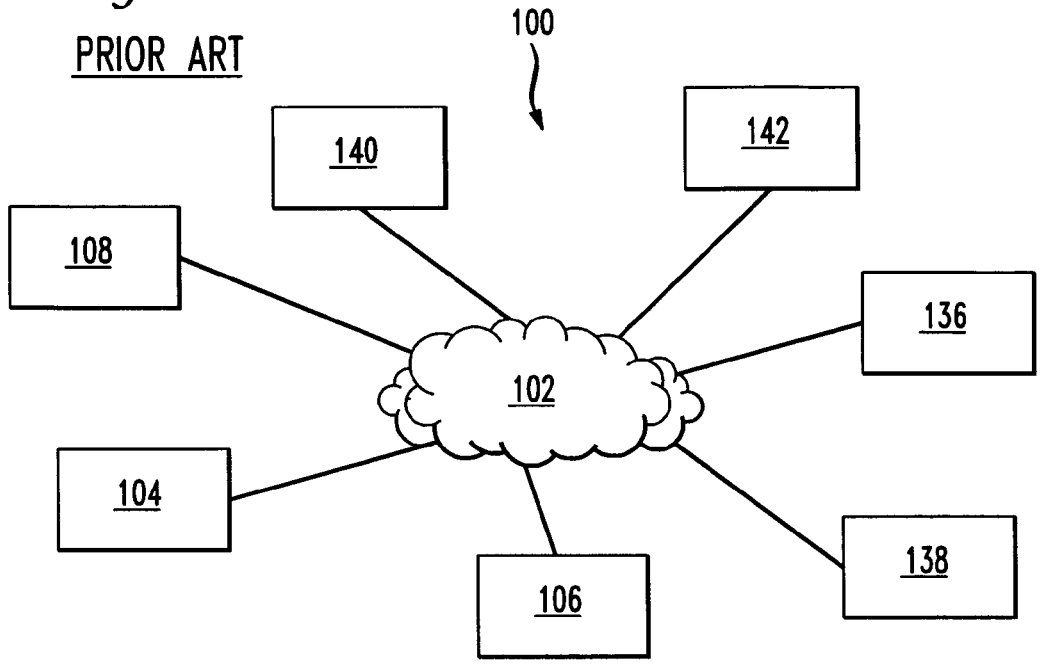
FIG. 1 shows an illustrative prior art network in which services are provided to subscribers.

Many different communication networks are used to provide services to subscribers. For example, FIG. 1 shows an illustrative prior art content-distribution network 102, illustratively an internet protocol (IP) network, in which content, such as multi-media content or other desired content, may be delivered to customers. Such a content-distribution network is merely illustrative in nature and one skilled in the art will appreciate how the principles described herein below may be used with a wide variety of networks providing services to consumers.

Referring once again to FIG. 1, it is to be understood that the network elements shown in FIG. 1, such as servers 104, 108 and 140, are logical elements. As used herein, a network element refers to a logical entity which performs a network function. A network node refers to the computing platform on which a network element is implemented. FIG. 1 shows an illustrative content-distribution system 100 that includes a data network 102, illustratively an IP network. Various servers 104, 108 and 140, illustratively content-delivery servers located at different companies, are connected to network 102. One skilled in the art will recognize that servers 104, 108 and 140 may represent servers at homes or another other source or destination for content instead of companies. Various computing devices 106, 136, 138 and 142 also communicate with network 102 and, for example, are suitable to receive content from servers 104, 108 and 140. Computing devices 106, 136, 138 and 142 may be computers, handheld devices, wireless phones, PDAs or any other computing device.

A networked content-distribution network, such as that shown in FIG. 1 may, for example, connect a large numbers of content providers to a large number of subscribers. One problem typically associated with networks having such a large number of providers and subscribers is that not all subscribers are capable of receiving the content in the format in which it was originally published. For example, when a content provider generates a document in one format, such as the well-known Microsoft Word document format, and then emails or otherwise communicates the document to a person, such as a subscriber, via the network, the recipient may not have means to view the document in this proprietary format. Illustratively, the recipient may only have a viewer for Portable Document Format (PDF) files, such as Adobe Reader, which is typically unable to display the native Word documents. Therefore, a transformation from Word format to PDF format is necessary. Similarly, another format conflict may result with communications between, for example, a web server and a wireless device, such as a personal digital assistant or smart phone that can achieve access to the Internet. Such wireless devices commonly utilize a much smaller screen size than a laptop or desktop computer that may not be suited to display content in its intended, original resolution. In this case, the document in the web server's format (e.g., Hypertext Markup Language (HTML)) must be transformed to one suitable for small wireless devices (e.g., Wireless Markup Language (WML)). Yet another example relates to content that is created in various formats, such as the well-known eXtensible Markup Language (XML) format, that is to be transmitted to a content subscriber. The subscriber may have different software or a different operating system and may not be able to view or take advantage of multimedia features of the content as published. Further, the subscriber or the publisher may have no method of controlling how the content is created to be transmitted.

Accordingly, the system of FIG. 1 may illustratively support the transformation of published content to a content format required or desired by subscribers. By using a distributed transformation system, where such transformations may be provided at different element locations in the network, rendering and presentation of content in various formats may be done advantageously in a timely fashion.

In order to deliver content and/or to transform content from one format to another, distributed transformation systems are typically used. One skilled in the art will recognize that such distributed transformation systems may be implemented on the provider or subscriber nodes of the content-distribution network, may be implemented on separate nodes operated by content providers, such as on dedicated servers within network 102, or, alternatively, may be implemented on network nodes operated by a third party. Whatever the implementation, one skilled in the art will recognize that such transformation systems associated with the content-distribution network may serve many providers and subscribers simultaneously, thereby performing many simultaneous transformations of data at the same time.

In performing the desired transformations, as discussed above, each desired element of a transformation system may utilize a threaded operating environment. As used herein, the term thread is used to refer to an instance of a single use of a software program that can handle multiple concurrent users. If multiple instances of the software program occur, e.g., if more than one user is obtaining services provided by the software program, a thread is created and maintained for each of those instances. As will be known to one skilled in the art, a thread as used herein is an individual instance of a computer program. Multiple threads may operate simultaneously in order to, for example, facilitate the efficient execution of multiple tasks within a process. Each thread can be associated with each user of a software program as the program alternately gets re-entered on behalf of different users. By running multiple threads of a service simultaneously, such as multiple transformation operations, multiple instances of a particular service may be provided to multiple subscribers to that service. In one illustrative embodiment, the operating environment of a network element is a Java Virtual Machine (JVM) running threaded Java applications. In such an environment, a run-time executive program written in Java and running in the JVM is responsible for receiving requests, illustratively via an IP network such as the Internet, and then invoking an instance of the appropriate application. Each such application invocation results in a new instance of a thread program being invoked in the JVM, possibly spawning child threads in order to provide the service desired. One skilled in the art will recognize that many such threaded applications are commonly used in many implementations.

One difficulty in providing services in a network, such as a multiple-threaded distributed transformation service, is monitoring network usage. In particular, when multiple threads are used to provide a service, it is frequently problematic to accurately assess which subscriber used what portion of available network service capacity. This can lead to other undesirable uncertainties. For example, if an accurate assessment of the use of network resources is not available, it is difficult if not impossible to effectively place a limit on a particular subscriber's maximum resource usage. Additionally, it is equally as difficult to accurately charge for services provided since the portion of network resources consumed by any particular subscriber is unknown.

The present invention substantially solves the foregoing difficulties. In particular, in accordance with the principles of the present invention, a pool of network resources, for example a number of network threads, is identified, the size of which a subscriber or service provider can directly or indirectly control according to the desired level of service. Of course, the greater the size of the pool, for example, the greater the cost to the subscriber. Each time a new service request for a given service used by a subscriber is received, a new thread is then allocated from the subscriber's pool, if one is available. A network element then monitors the threads operating to provide a service in order to track the usage of the service over time. It is impractical for such monitoring to occur every computing clock cycle. Therefore, in accordance with the principles of the present invention, the monitoring network element periodically or randomly samples the execution environment to detect which threads are running, which network resources are being utilized by each thread, and other information deemed desirable to collect.

In order to determine which threads are operating at any given time, the monitoring network element illustratively records thread identifiers for each running thread. These thread identifiers and other related information are then entered into a log which can be, illustratively, retrieved by a subscriber or a service provider for, in one example, billing purposes. These logs may, for example, be stored on a network node or at a third party service provider network node. When used for billing purposes, such logs may be illustratively displayed on a display of a graphical computer or, alternatively, printed out as a bill to be forwarded to a subscriber. Such a billing method is advantageous in that it directly correlates the proportion of consumed network resources to a charge for those services.

One skilled in the art will also recognize that the information captured in the aforementioned logs from the running threads may be used for other purposes. For example, service providers, such as a transformation service provider, may use the collected data to ensure compliance with a service level agreement. In this role, a service provider can illustratively use this information to reserve additional threads as back up capacity to support a guaranteed class of service to a subscriber. Alternatively, this information can be used to limit the number of threads assigned to a subscriber in order to limit the fraction of available thread capacity assigned to any one subscriber. In addition, this information may be used in a real-time marketing analysis of which various formats of content are requested or transformed in reaction to a particular event (e.g., how much of a service demand is experienced after a television commercial).

Finally, in another example of how such monitoring may be used, the provider of a service can use the collected information for real-time capacity allocation. For example, if a thread pool is fully utilized on one network node, and a subscriber has requested backup capacity coverage (i.e., additional thread capacity that supports additional threads of a service), a new node can automatically and temporarily assume the processing of the additional requested service up to a desired capacity. Accordingly, brief periods of high-capacity, temporary allocation of network resources, with usage charged upon actual usage (due to the aforementioned monitoring function) is facilitated in accordance with the principles of the present invention. Such an ability for an incremental additional amount of processing resources is much more cost effective to a subscriber as opposed to, for example, having to pay for a reserved amount of resources at all times when incremental resources are not required.

Figure 2:
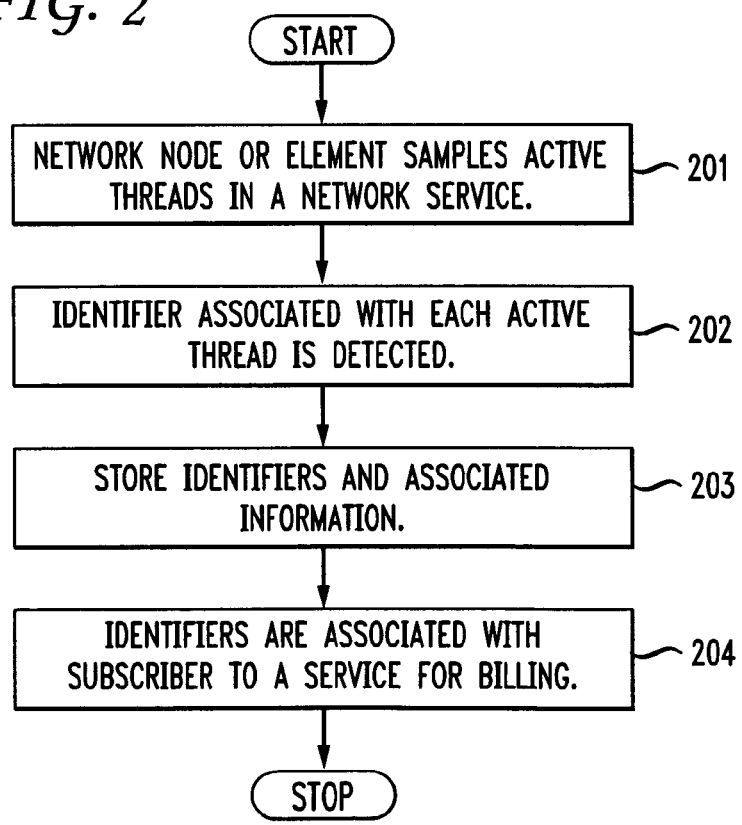
FIG. 2 shows a first method in accordance with the principles of the present invention.

FIG. 2 shows a method for sampling active threads and associates identifiers with a customer for billing purposes. in accordance with the principles of the present invention. At step 201, a network node or element repeatedly samples active threads of an active session of a service being provided to a subscriber. Next, at step 202, an identifier associated with each active thread, together with other information relating to the thread's invocation, ownership, and execution context is detected. For example, in one embodiment, a representation of the thread's execution stack is collected for later use in profiling how the thread spends its time, as is known in the art. In this way, thread activity can be distinguished for later use in charging differently for CPU intensive threads than for input/output intensive threads. Alternatively, thread profiles can be reported to the developers of the threaded application to provide feedback useful for performance optimization. At step 203, the identifiers and associated information is stored, for example, in a database or log. Finally, at step 204, the identifiers and other information are associated with a subscriber to a service for use in, for example, billing for network resources consumed by that subscriber.

FIG. 3 shows another method for billing subscribers in accordance with the principles of the present invention. At step 301, the network log is accessed and, at step 302, thread identifiers are retrieved from the log. Finally, at step 303, elements of data, such as subscriber identification information, service identifying information, thread stack traces, and resource utilization information is displayed in a view, for example, on a computer display or on a bill generated for a particular subscriber.

FIG. 4 shows a block diagram of a computer that can be used at a network node to perform the monitoring and reporting functions as described herein above. Referring to FIG. 4, computer 407 may be implemented on any suitable computer adapted to receive, store, and transmit data such as the aforementioned profiling, monitoring, or billing information. Illustrative computer 407 may have, for example, a processor 402 (or multiple processors) which controls the overall operation of the computer 407. Such operation is defined by computer program instructions stored in a memory 403 and executed by processor 402. The memory 403 may be any type of computer readable medium, including without limitation electronic, magnetic, or optical media. Further, while one memory unit 403 is shown in FIG. 4, it is to be understood that memory unit 403 could comprise multiple memory units, with such memory units comprising any type of memory. Computer 407 also comprises illustrative modem 401 and network interface 404 that are used to interface with other network elements and/or nodes either internal to the service provider via an illustrative intranet or, alternatively, external to the service provider via, for example, the Internet. Computer 407 also illustratively comprises a storage medium, such as a computer hard disk drive 405 for storing, for example, data and computer programs adapted for use in accordance with the principles of the present invention as described hereinabove. Finally, computer 407 also illustratively comprises one or more input/output devices, represented in FIG. 4 as terminal 406, for allowing interaction with, for example, a service provider technician or database administrator. One skilled in the art will recognize that computer 407 is merely illustrative in nature and that various hardware and software components may be adapted for equally advantageous use in a computer in accordance with the principles of the present invention.

Figure 5:
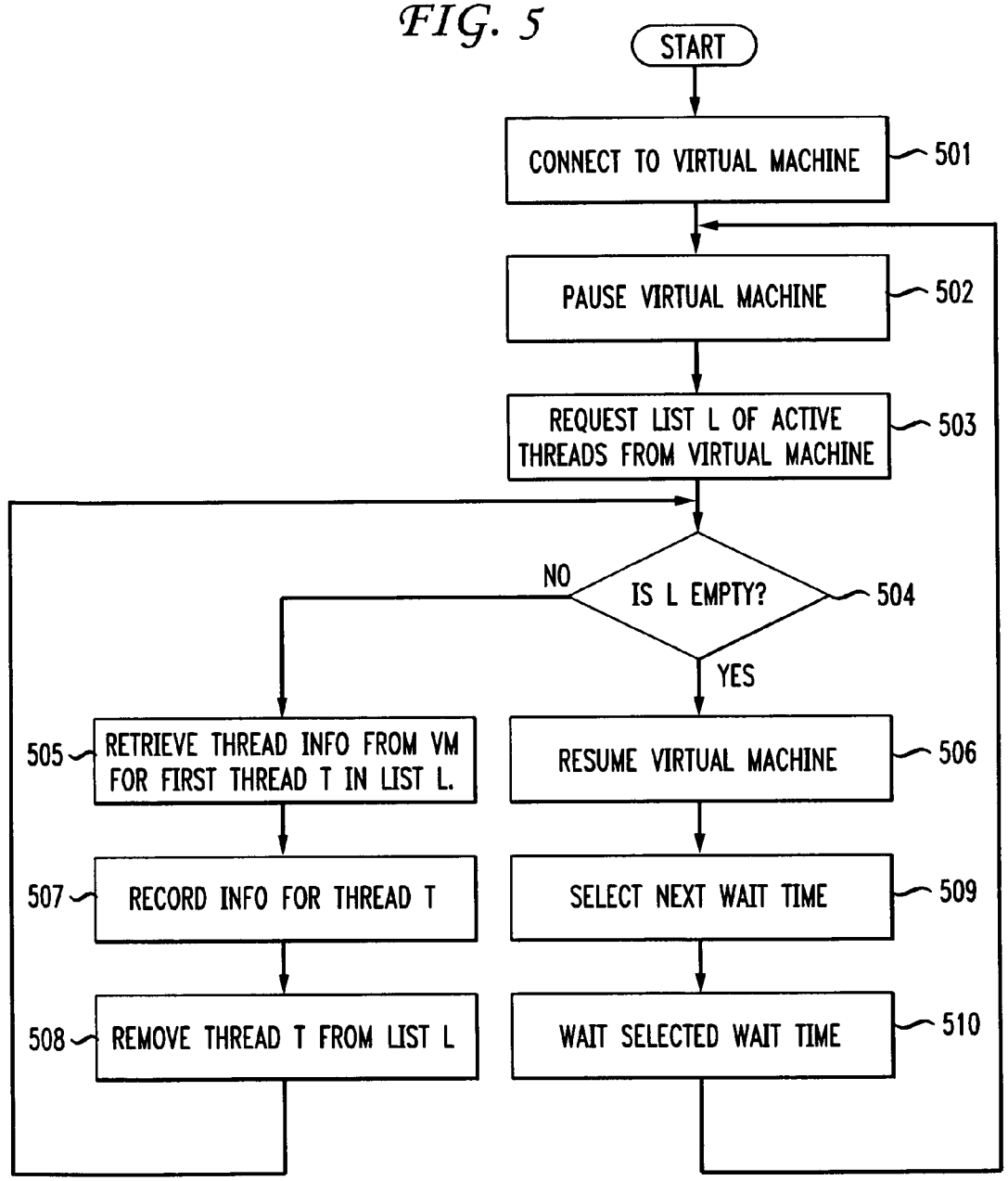
FIG. 5 shows a method in accordance with the principles of the present invention for collecting samples of thread information.

FIG. 5 shows a method for sampling the run-time state of a network element. Illustratively, this advantageous embodiment is implemented using a virtual machine, for example a Java Virtual Machine, having the facilities to allow remote control of the virtual machine through an interface like the Java Virtual Machine Profiler Interface (JVMPI) via a programming interface such as the Java Platform Debugger Architecture (JPDA). As is well-understood, a virtual machine is a self-contained operating environment that behaves as if it is a separate computer. Typically, a virtual machine creates an environment to which a user connects via a network so that the user can operate software in a dedicated memory space. At step 501, the network element is connected to the virtual machine. Then, at step 502, the virtual machine is paused. At step 503, a list of active threads is received from the virtual machine and, at step 504, a determination is made whether the list is empty. If yes, then, at step 506, the virtual machine is resumed and, at step 509, a wait time Δ is selected. At step 510, the virtual machine waits the selected wait time Δ before resuming the process again at step 502. If, on the other hand, the list of active threads is not empty at step 504, at step 505 thread information is retrieved from the virtual machine for the first thread in the list of active threads. At step 507, information for that thread is recorded and, at step 508, that thread is removed from the list of active threads.

FIG. 6 shows a sample record log structure illustrative of one embodiment of the present invention. The log is broken up into sections, one per active thread sample at a particular time in sample time column 601. Each sample record 602, 603 and 604, etc. is further broken up in to subsections, one per thread executing during the sample. For example, for sample time t=42, subsections are created for each thread. And within each such subsection, the thread record has fields containing, illustratively, the thread identifier (column 605), application identifier (column 606), optional user identifier (representing the user who is logged into the application and making this request) (column 607), as well as a dump of the stack trace (column 608). As is well known, a stack trace is a listing of all active functions, procedures, and pseudo functions that are active on the runtime stack of the program at the time.

FIG. 7 shows a method of computing billing information in accordance with the principles of the present invention in a way such that the cost of operations is, illustratively, divided equally among all running threads. As one skilled in the art will recognize the thread records could be used to compute more complex bills based upon types of usage or other characteristics of the threads. In accordance with one illustrative embodiment only threads actually in the "RUN" state, as notated in the stack trace, get attributed any cost at all. All such threads get an equal share of the cost for that sample. In an alternative embodiment, one could simply count threads of a given application active at the sample and charge per thread. This cost measure could be advantageous for billing based upon thread pool occupancy rather than CPU time costs. One could also combine these measures in various ways, optionally with other cost features. The costs incurred over all samples are summed and then a bill is computed by converting this abstract cost measure into dollars or other monetary terms. Further, one skilled in the art can see that one could further aggregate this cost information obtained from each network element's log into a bill for providing the service at multiple nodes of the network. Referring to FIG. 7, at step 701 the number of accounts for each subscriber is set to zero. Then, at step 702, a list of all samples between a desired start and end time is retrieved. At step 703, a determination is made whether the list of samples is empty. If so, at step 704 a bill is generated for the subscriber. If not, then, at step 705, a set of threads corresponding to the subscriber in the first sample in the list of samples is determined and recorded and the records corresponding to that subscriber are removed from the list of all samples. Next at step 706, the number of threads corresponding to the subscriber and that are in the run state are determined. Finally, at step 707, each thread in the run state is attributed to the account of the subscriber corresponding to that thread.

Figure 8A:
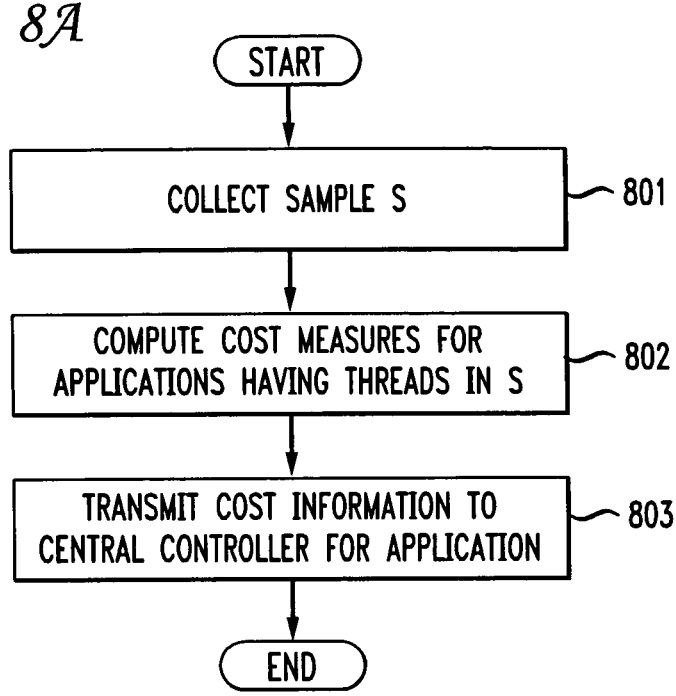
FIG. 8 shows a method in accordance with the principles of the present invention for controlling an application in accordance with the principles of the present invention.

FIG. 8 depicts a method in accordance with the principles of the present invention for controlling the total expenditure of running an application in an application aware network. The method may, illustratively, take place at each network element capable of running threads for an application A, as well as at a distinguished network element, termed the controller element for A. FIG. 8A shows that each element running threads for application A must report the cost measure for application A computed from each sample to the controller element for A. Illustratively, this reporting could be via a network socket connection, remote procedure call, or asynchronous XML formatted message sent via an IP network such as the Internet. Referring to FIG. 8A, a sample of running threads is taken at step 801. At step 802, a cost measurement for applicants having threads running in the sample is calculated. And finally, at step 803, the cost information is transmitted to a central controller for each application.

Figure 8B:
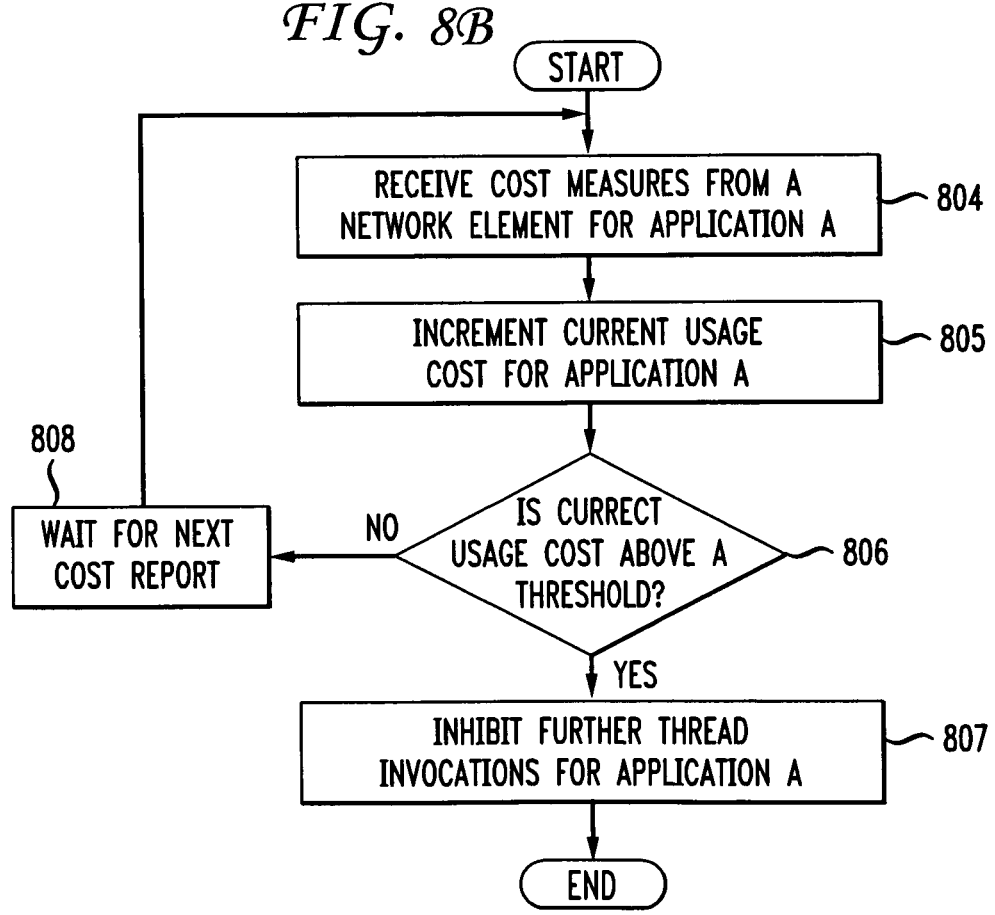

FIG. 8B illustrates that the controller element for application A receives requests, maintains a running total of costs and, when this total exceeds a threshold, issues a command to the network elements to inhibit future invocations of threads for application A. Specifically, referring to FIG. 8B, at step 804, a cost measure is received from a network element for the application A and, at step 805, the current usage cost for application A is incremented. Next, at step 806, a determination is made whether the cost usage for application A is above a predetermined threshold. If yes then, at step 807, further invocation of threads is inhibited. If not then, at step 808, the application controller element waits for the next cost report. As can be appreciated by one skilled in the art, this cost monitoring can be done on an absolute basis (spend up to a limit and then stop) or on a time rate basis (spend up to so much per time interval). In the latter case, once sufficient time passes such that the average rate of thread cost accrual dropped below the limit, the controller for application A would issue a command to restore thread invocations for application A. In this way, the network could provide a maximum rate of a service using the principles of the present invention.

It will be obvious to one skilled in the art in light of the foregoing that one could also implement a controller that functions to allocate and deallocate network elements for an application using the principles described herein. For example, when the application controller for application A detects that the total thread cost measure has exceeded a threshold, it could (instead of inhibiting future invocations) issue a command to deploy application A on a network element not currently in use for application A (e.g. one currently idle or under utilized). Similarly, when the total thread cost measure drops below a threshold, the controller could issue a command to remove application A from at least one network element currently hosting application A. Additionally, the controller for application A could aggregate threads for application A onto fewer network elements using well-known methods when it detects that many elements each run a small number of such threads. Aggregation is advantageous in that it reduces memory usage of some of the network elements.

By repeatedly collecting samples in this way, a statistical picture of thread activity is built up over time at each node in the application network. For example, one can statistically estimate how much of the network's resources are consumed per month on behalf of each subscriber's application. One can also use this information in real time for control purposes, such as to deactivate an application after it has exhausted a predetermined "budget" for the month. Or, as mentioned previously, one can sense when an application is experiencing a "burst" of traffic and allocate more processing resource to it across the network.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for use in providing a network service via a plurality of threads on a plurality of network nodes, the method comprising:
   randomly sampling an execution environment of a first network node to detect active threads on the first network node, each of the detected active threads indicative of a currently active session of the network service;
   detecting a first identifier of a first detected active thread;
   storing the first identifier and a stack trace of the first detected active thread in a log on the first network node;
   accessing the log;
   using the log to limit a fraction of available active thread capacity assigned to any one subscriber;
   retrieving the first identifier from the log;
   retrieving a first element of data relating to the network service based on the first identifier, wherein the first element of data comprises:
      first information indicative of the network service provided to a subscriber with a service level agreement and second information indicative of a fraction of total active thread capacity that was used in providing the network service to the subscriber;
   associating the first identifier with the subscriber;
   in response to determining, based on the service level agreement, that the subscriber has requested a guaranteed class of service:
      reserving additional active threads to the subscriber;
      performing temporary allocation of a new node for processing the additional active threads of the subscriber, owing to full utilization of active threads on the first network node.

2. The method of claim 1 wherein storing the first identifier comprises:
   storing the first identifier in a database.

3. The method of claim 1 wherein associating comprises:
   associating the first detected active thread with the network service provided to the subscriber.

4. The method of claim 1 further comprising:
   generating a bill for the subscriber based on the fraction of total active thread capacity.

5. The method of claim 1 further comprising:
   generating a bill based on the associating the first identifier with the subscriber.

6. The method of claim 1 wherein retrieving a first element of data comprises:
   generating a report associated with the first detected active thread, the report indicative of an input to the first detected active thread and an output of the first detected active thread.

7. An apparatus for use in providing a network service via a plurality of threads on a plurality of network nodes, the apparatus comprising:
   means for randomly sampling an execution environment of a first network node to detect active threads on the first network node, each of the detected active threads indicative of a currently active session of the network service;
   means for detecting a first identifier of a first detected active thread;
   means for storing the first identifier and a stack trace of the first detected active thread in a log on first the network node;
   means for accessing the log;
   means for using the log to limit a fraction of available active thread capacity assigned to any one subscriber;
   means for retrieving the first identifier from the log;
   means for retrieving a first element of data relating to the network service based on the first identifier, wherein the first element of data comprises:
   first information indicative of the network service provided to a subscriber with a service level agreement, and second information indicative of a fraction of total active thread capacity that was used in providing the network service to the subscriber;
   means for associating the first identifier with the subscriber;
   means for initiating, in response to determining, based on the service level agreement, that the subscriber has requested a guaranteed class of service:
   means for reserving additional active threads to the subscriber;
   means for performing temporary allocation of a new node for processing the additional active threads of the subscriber, owing to full utilization of active threads on the first network node.

8. The apparatus of claim 7 wherein the means for storing comprises means for storing the first identifier in a database.

9. The apparatus of claim 7 wherein the means for associating comprises:
   means for associating the first detected active thread to the network service provided to the subscriber.

10. The apparatus of claim 7 further comprising:
    means for generating a bill for the subscriber based on the fraction of total active thread capacity.

11. The apparatus of claim 7 further comprising: means for generating a bill based on the associating.

12. The apparatus of claim 7 wherein the means for retrieving a first element of data comprises:
    means for generating a report associated with the first detected active thread, the report indicative of an input to the first detected active thread and an output of the first detected active thread.

* * * * *